(12) United States Patent
Funke et al.

(10) Patent No.: US 6,425,946 B1
(45) Date of Patent: Jul. 30, 2002

(54) METHOD AND APPARATUS FOR REMOVING TRACE IMPURITIES FROM A GAS USING SUPERACTIVATED CARBON MATERIAL

(75) Inventors: Hans H. Funke; Dan Fraenkel; Virginia H. Houlding, all of Boulder, CO (US)

(73) Assignee: Matheson Tri-Gas, Inc., Longmont, CO (US)

( * ) Notice: Subject to any disclaimer, the term of this patent is extended or adjusted under 35 U.S.C. 154(b) by 0 days.

(21) Appl. No.: 09/748,734

(22) Filed: Dec. 26, 2000

(51) Int. Cl.[7] .......................... B01D 53/02; B01D 53/28
(52) U.S. Cl. .......................... 96/108; 502/416; 502/519
(58) Field of Search .............................. 96/108; 95/117, 95/139, 140, 141, 143, 147, 901, 903; 502/180, 416, 519, 418; 206/0.7; 53/432; 252/194

(56) References Cited

U.S. PATENT DOCUMENTS

| | | | |
|---|---|---|---|
| 2,283,989 A | * 5/1942 | Henry ........................ 210/251 |
| 4,738,694 A | 4/1988 | Godino et al. |
| 4,786,294 A | 11/1988 | Jonqueres et al. |
| 4,966,611 A | 10/1990 | Schumacher et al. |
| 5,015,411 A | 5/1991 | Tom et al. ................... 252/194 |
| 5,443,736 A | * 8/1995 | Szmanda et al. ............ 210/668 |
| 5,536,302 A | * 7/1996 | Golden et al. ............... 95/138 |
| 5,829,139 A | * 11/1998 | Murphy et al. .............. 95/901 |
| 5,833,726 A | * 11/1998 | Kinkead et al. ............. 454/187 |
| 6,022,398 A | 2/2000 | Cho et al. ...................... 95/98 |
| 6,064,560 A | * 5/2000 | Hirahara et al. ............. 502/416 |
| 6,110,258 A | * 8/2000 | Fraenkel et al. .............. 95/117 |
| 6,127,312 A | * 10/2000 | Mochida et al. ............. 502/416 |
| 6,131,368 A | * 10/2000 | Tramposch et al. .......... 53/400 |

* cited by examiner

*Primary Examiner*—David A. Simmons
*Assistant Examiner*—Frank M. Lawrence
(74) *Attorney, Agent, or Firm*—Steven C. Petersen; Sarah S. O'Rourke; Hogan & Hartson, LLP

(57) ABSTRACT

Trace impurities such as organic compounds and carbon monoxide are reduced to sub-ppb levels in gases such as nitrogen, helium and argon, by gas purifying systems that contain an ultra-low emission (ULE) carbon material. Ultra-low emission (ULE) carbon materials can be made from commercially available carbon materials in the form of pellets, extrudates and beads and is capable of removing impurities from a gas stream down to parts-per-billion (ppb) and sub-ppb levels without concurrently emitting other impurities such as moisture or carbon dioxide to the purified gas stream. The carbon material is superactivated by heating the carbon to temperatures from 300° to about 800° degrees C. in an ultra-dry, inert gas stream. The ultra-low emission (ULE) carbon material is handled and stored in an environment that minimizes contamination from moisture and other oxygenated species in order to maintain its ppb and sub-ppb impurity removal and low emission properties. The ultra-low emission (ULE) carbon material can be used as "stand-alone" purifier material or in combination with other scavenging materials that are capable of removing large quantities of impurities such as oxygen and moisture that are not removed or only marginally removed by the ultra-low emission (ULE) carbon material.

22 Claims, 7 Drawing Sheets

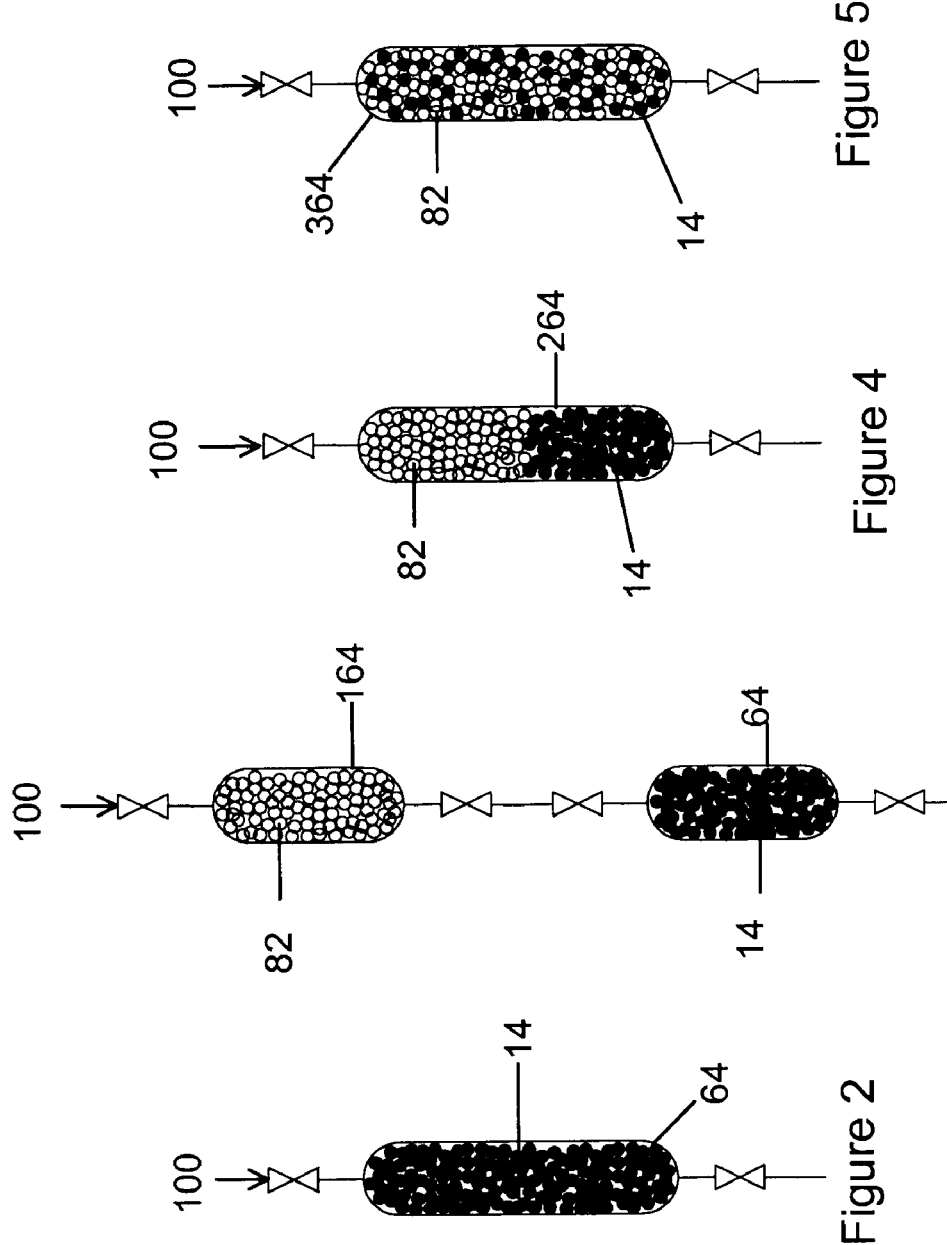

METHOD AND APPARATUS FOR REMOVING TRACE IMPURITIES FROM A GAS USING SUPERACTIVATED CARBON MATERIAL

BACKGROUND OF THE INVENTION

1. Field of the Invention

This invention relates to the field of gas purification, and more specifically to the removal of trace impurities from inert gases such as nitrogen, helium, and argon using solid scavenger adsorption materials. More particularly, this invention comprises a method of reducing concentrations of trace impurities, such as hydrocarbons, carbon monoxide, and carbon dioxide, from process gases to parts-per-billion and sub-parts-per-billion levels using an ultra-low emission carbon based scavenger. This invention further relates to reducing concentrations of impurities such as organic compounds including, but not limited to, substituted and unsubstituted hydrocarbons, wherein said hydrocarbons include saturated, unsaturated, and aromatic hydrocarbons, carbon monoxide, and carbon dioxide, as well as other impurities such as oxygen and larger quantities of moisture ($H_2O$), from process gases by combining an ultra-low emission carbon material of this invention and a second scavenger material capable of removing oxygen and/or moisture from the process gas.

2. Description of the Prior Art

Numerous products and processes require pure gases. One known method of gas purification involves the adsorption of process gas impurities on a bed or column of solid scavenger material. In these solid adsorption methods, impurities are caught by the surface of the scavenger material while the process gas preferably passes unaltered through the bed or column.

Commonly used solid scavenger adsorption materials include alumina, activated carbon, silica, adsorption clays, and secondary scavengers. Activated carbon, for example, is used in PSA (Pressure Swing Adsorption) plants and for solvent recovery from air in painting facilities (See, for example, Wood and Stampfer, *Carbon*, 30:593 (1992); Wood and Stampfer, *Carbon*, 31:195 (1993); Nelson et al., *Am. Ind. Hyg. Assoc. J.*, 33:797 (1972); and Nelson et al., *Am. Ind. Hyg. Assoc. J.*, 52:235 (1991)). These techniques are known to reduce selected impurities in a gas stream down to single digit percentages, and perhaps even as low as ppm (parts per million) concentrations. However, the use of solid scavenger adsorption materials operating at ambient conditions to reduce parts-per-billion (ppb) levels of impurities, particularly hydrocarbons, to sub-ppb levels without contaminating the gas stream with other impurities such as moisture is not known.

For most applications, reducing impurities in gases down to the ppm level is satisfactory. However, ultra-pure gases having impurity concentrations not exceeding ppt (parts-per-trillion (ppt) levels are required in a growing number of industries. For example, in semiconductor fabrication processes, gases such as nitrogen, helium and argon are often required to not have more than low ppb or sub-ppb impurity levels to ensure that the impurities do not degrade the quality, and hence the performance of the semiconductor chips. Gas purification systems are therefore widely used in the manufacture of semiconductors to remove process gas impurities to very low, trace concentrations.

The desire to develop methods to reduce impurities in process gases down to sub-ppb concentrations is further driven by the present ability to measure impurities at extremely low levels. Modern chemical instrumentation such as Atmospheric Pressure Ion Mass Spectrometry (APIMS) permits the detection of process gas impurities such as carbon monoxide, carbon dioxide, oxygen, and moisture ($H_2O$) at sub-ppb concentrations.

The advances in the detection of trace levels of hydrocarbons with APIMS has motivated researchers to further reduce the levels of these impurities in ultra-pure process gases to below the limits of detection of this supersensitive instrumentation. One challenge has been to develop gas purification materials and techniques that remove hydrocarbon impurities from an ultra-pure gas without adding trace amounts of other impurities.

Conventionally activated carbon, for example, is known as a very effective adsorbent for removing hydrocarbon impurities from gases. However, conventionally activated carbon is typically activated at 200° C. to 400° C. in gas streams contaminated with ppm levels of impurities such as moisture and $CO_2$. After conventional activation, the carbon material contains trace amounts of water and $CO_2$ that are either not completely removed during activation or re-adsorbed in the contaminated environment of the treatment process. The carbon material may also produce trace amounts of moisture and $CO_2$ during thermal activation due to chemical reaction of residual functional groups or adsorbed species, such as by dehydroxylation or decarboxylation reactions. The residual water and $CO_2$ in the conventionally activated carbon material are then released in small quantities into a gas stream during a gas purification process, thereby causing significant contamination of the gas and rendering the effluent gas useless for high purity applications. In some cases, conventionally activated carbon is characterized as "hydrophobic" (repels or fails to adsorb water), even though traditionally activated carbon has been shown to weakly adsorb moisture upon exposure of a gas containing several hundreds to several thousands of ppm of moisture (see, for example, Barton et al., *Carbon*, 22:22 (1984), which is specifically incorporated herein by reference). However, this adsorbed moisture, is also easily released into a process gas stream during purification of the gas. Thus, reducing hydrocarbon impurities in a process gas to sub-ppb levels while maintaining very low levels of water vapor and $CO_2$ has proven extremely difficult.

SUMMARY OF THE INVENTION

Accordingly, it is an object of this invention to provide a method for reducing the concentration of hydrocarbon impurities as well as other impurities in a process gas to sub-parts-per-billion (sub-ppb) levels, while at the same time not emitting higher levels of other contaminants, such as water vapor and $CO_2$, into the process gas being purified.

Another object of this invention is to provide "ultra-low emission" (ULE) carbon materials for reducing trace impurities such as organic compounds including, but not limited to, substituted and unsubstituted hydrocarbons, wherein said hydrocarbons include saturated, unsaturated, and aromatic hydrocarbons, carbon monoxide (CO), carbon dioxide ($CO_2$), and small amounts water vapor from process gas streams such as helium (He), nitrogen ($N_2$) and argon (Ar) to parts-per-billion (ppb) and sub-parts-per-billion (sub-ppb) levels.

Another object of this invention is to provide a method of producing ultra-low emission (ULE) carbon materials capable of reducing the concentration of organic compounds including, but not limited to, substituted and unsubstituted hydrocarbons, wherein said hydrocarbons include saturated, unsaturated, and aromatic hydrocarbons, carbon monoxide (CO), carbon dioxide ($CO_2$), and water vapor ($H_2O$) from a process gas to ppb and sub-ppb levels.

It is a further object of the present invention to provide a method of purifying gases with ultra-low emission (ULE) carbon materials prepared according to the method of this invention, wherein the method reduces trace amounts of hydrocarbon, carbon monoxide (CO), carbon dioxide ($CO_2$), and water vapor ($H_2O$) impurities to ppb and sub-ppb levels.

It is a further object of the present invention to provide a one-component gas purifier system comprising a bed of an ultra-low emission (ULE) carbon material of this invention capable of reducing trace levels of organic compounds including, but not limited to, substituted and unsubstituted hydrocarbons, wherein said hydrocarbons include saturated, unsaturated, and aromatic hydrocarbons, carbon monoxide, carbon dioxide, oxygen and water vapor from a process gas to ppb and sub-ppb levels.

Yet another object of this invention is to provide a two-component gas purifier system comprising an ultra-low emission (ULE) carbon material of this invention and a secondary scavenger material to remove impurities such as oxygen and larger quantities of moisture that are not scavenged by the ultra-low emission (ULE)carbon material. The two-component purifier system of this invention acts as a combination gas purifier capable of producing a purified gas with only sub-ppb levels of impurities such as organic compounds including, but not limited to, substituted and unsubstituted hydrocarbons, wherein said hydrocarbons include saturated, unsaturated, and aromatic hydrocarbons, CO, $CO_2$, $O_2$, and water vapor. In one embodiment, the secondary purifier is a chemical scavenger material that removes a variety of impurities such as moisture and oxygen from gas streams but does not remove hydrocarbons. In one embodiment, the secondary purifier is an organometallic resin as disclosed in U.S. Pat. No. 4,603,148, which is specifically incorporated herein by reference. Other materials that are suitable for use as secondary purifiers for the removal of moisture include, but are not limited to, inorganic high-surface-area solids such as oxides and mixed oxides, e.g., alumina, silica, silica-alumina, aluminosilicate zeolites and other molecular sieves. These materials may be modified by salts, oxides or hydroxides of the Group IA or IIA metals, and preferably are thermally activated, as described in copending U.S. Provisional Patent Application No. 60/251,000, filed Dec. 4, 2000, which is specifically incorporated herein by reference. The secondary purifier material is referred to herein as a "secondary scavenger".

To achieve the foregoing and other objects and in accordance with the purposes of the present invention, as embodied and broadly described therein, one embodiment of this invention provides a method for producing an ultra-low emission (ULE) carbon material, comprising heating a carbon material under inert conditions at a temperature and for a time sufficient to remove substantially all of the water and carbon dioxide ($CO_2$) contained in the carbon material to produce an ultra-low emission (ULE) carbon material, and transferring the ultra-low emission (ULE) carbon material to a container under conditions that do not allow moisture, carbon dioxide, or other atmospheric contaminants to be reintroduced into the ultra-low emission (ULE) carbon material.

To further achieve the foregoing and other objects and in accordance with the purposes of the present invention, as embodied and broadly described therein, another embodiment of this invention comprises a method for removing impurities such as organic compounds including, but not limited to, substituted and unsubstituted hydrocarbons, wherein said hydrocarbons include saturated, unsaturated, and aromatic hydrocarbons, small amounts of water vapor, carbon monoxide (CO), and carbon dioxide ($CO_2$) from process gases, the method comprising contacting a process gas with a one-component gas purifying system comprising an ultra-low emission (ULE) carbon material produced according to this invention, wherein the concentrations of the trace impurities in the process gas are reduced to below about one part-per-million (ppm), and preferably to below about one part-per-billion (ppb) upon contacting the process gas with the ultra-low emission (ULE) carbon material of this invention.

To further achieve the foregoing and other objects and in accordance with the purposes of the present invention, as embodied and broadly described therein, another embodiment of this invention comprises a two-component gas purifying system comprising a canister containing ULE carbon material of this invention connected in series with, and downstream of, a canister that contains a bed of a secondary scavenger capable of removing larger amounts of moisture and carbon dioxide from a process gas, the series-connected canisters forming a two-component gas purifier that operates to purify an input gas stream.

To further achieve the foregoing and other objects and in accordance with the purposes of the present invention, as embodied and broadly described therein, another embodiment of this invention comprises a two-component gas purifier system comprising a canister having an upstream portion that contains a bed of secondary scavenger material capable of removing larger amounts of moisture and carbon dioxide from a process gas, and a downstream portion that contains a bed of ultra-low emission (ULE) carbon material of this invention.

To further achieve the foregoing and other objects and in accordance with the purposes of the present invention, as embodied and broadly described therein, another embodiment of this invention comprises a two-component gas purifier system comprising a canister containing a secondary scavenger material intermixed with an ultra-low emission (ULE) carbon material of the present invention.

Additional objects, advantages and novel features of this invention shall be set forth in part in the description that follows, and in part will become apparent to those skilled in the art upon examination of the following specification or may be learned by the practice of the invention. The objects and advantages of the invention may be realized and attained by means of the instrumentalities, combinations, and methods particularly pointed out in the appended claims.

BRIEF DESCRIPTION OF THE DRAWINGS

The accompanying drawings, which are incorporated herein and form a part of the specification, illustrate preferred embodiments of the present invention, and together with the description, serve to explain the principles of the invention.

In the Drawings:

FIG. 2 is a schematic representation of a one-component gas purifying system of this invention comprising a canister containing an ultra-low emission (ULE) carbon material of this invention.

FIG. 3 is a schematic representation of a two-component gas purifier system comprising a canister containing an ultra-low emission (ULE) carbon material of this invention connected in series with, and downstream of, a canister containing secondary scavenger beads.

FIG. 4 is a schematic representation of an alternative embodiment of a two-component gas purifier system of the invention comprising a canister having an upstream layer of secondary scavenger beads and a downstream layer of an ultra-low emission (ULE) carbon material of this invention.

FIG. 5 is a schematic representation of an alternative embodiment of a two-component gas purifier system of the invention comprising a canister having a mixture of an ultra-low emission (ULE) carbon material of this invention and secondary scavenger beads.

DETAILED DESCRIPTION OF THE INVENTION

Figure 1:
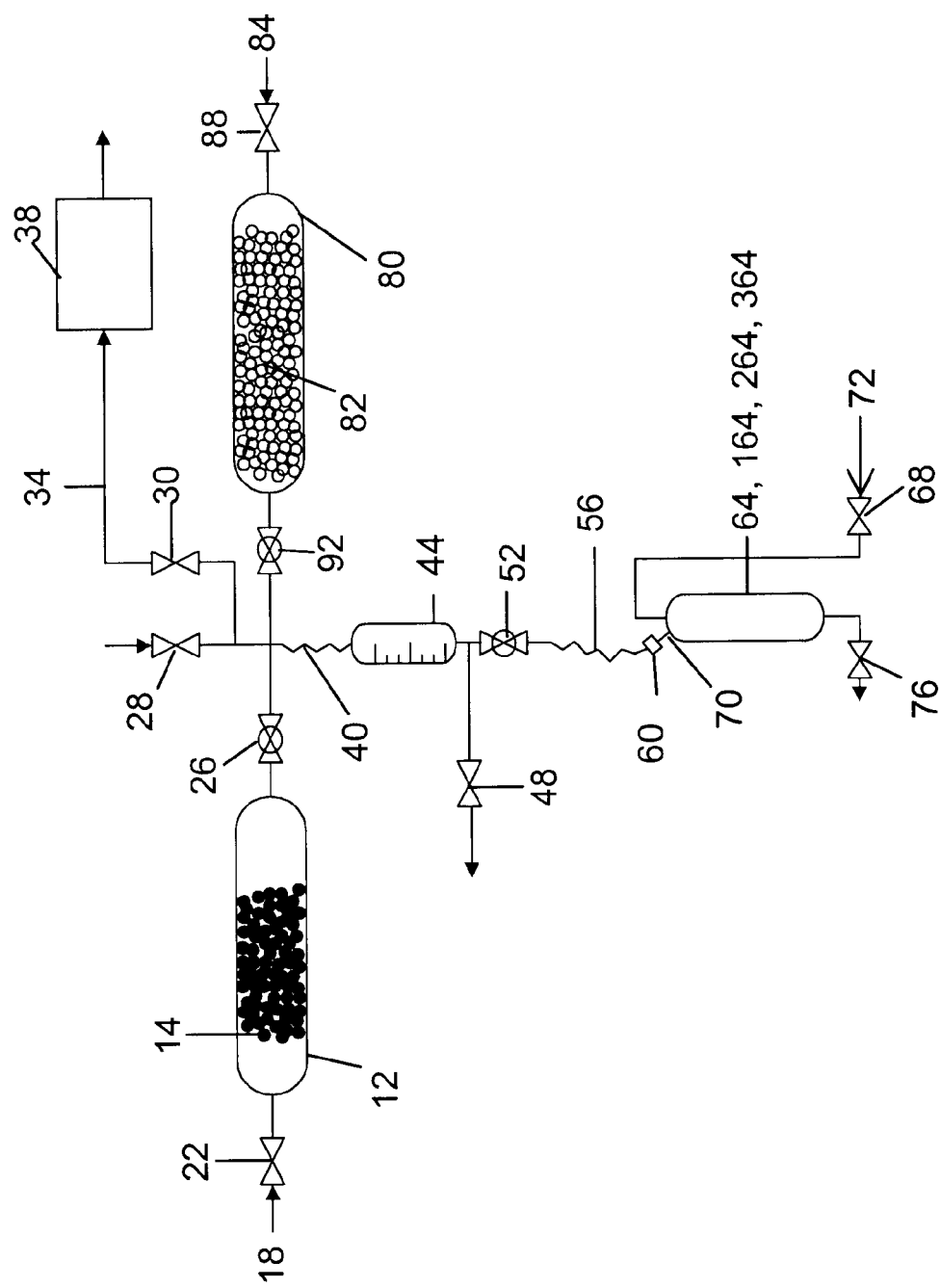
FIG. 1 is a schematic representation of the production of an ultra-low emission (ALE) carbon material according to the method of this invention, including the transport of the ultra-low emission (ULE) carbon material to a canister.

The present invention provides ultra-low emission (ULE) carbon materials for purifying process gases such as nitrogen ($N_2$), argon (Ar) and helium (He), and a method for producing the ultra-low emission (ULE) carbon materials. As used herein, the term "ultra-low emission (ULE)" carbon material refers to a carbon material that is sufficiently dehydrated to display strong hydrophilic properties and that, upon contact with a process gas containing sub-ppm amounts of water vapor ($H_2O$), produces a purified gas having a water concentration below at least parts-per-billion (ppb) levels, and preferably at sub-parts-per-billion (sub-ppb) levels. The ULE carbon material of this invention is further able to reduce the concentrations of trace impurities such as organic compounds, carbon monoxide (CO) and carbon dioxide ($CO_2$) from a process gas contaminated with such impurities to sub-ppb levels.

As used herein, the term organic compounds includes, but is not limited to, substituted and unsubstituted compounds including, but not limited to, alkanes, alkenes, alkynes, aromatic compounds including arenes and heteroarenes, alcohols, thiols, ketones, ethers, amines, and organic acids. The terms "alkanes,"/"alkenes," and "alkynes" include straight chain and branched chain alkyls, alkenes, and alkynes. The term "aromatic" compounds includes arenes and heteroarenes. As used herein, "arenes," is intended to mean any stable monocyclic, bicyclic or tricyclic carbon ring, wherein at least one ring is aromatic. The term "heteroarene", as used herein, represents a stable 5- to 7-membered monocyclic or stable 8- to 11-membered bicyclic heterocyclic ring which is either saturated or unsaturated, and which consists of carbon atoms and from one to four heteroatoms selected from the group consisting of N, O, and S, and including any bicyclic group in which any of the above-defined heterocyclic rings is fused to a benzene ring. As used herein, the term "substituted" organic compound refers to the above-listed compounds having one or more substituents, including, but are not limited to, halo (fluoro, bromo, chloro, iodo), hydroxy, nitro, amino, thio, alkoxy, aryloxy, and oxo.

As stated above, conventionally activated carbon retains enough moisture ($H_2O$) and carbon dioxide ($CO_2$) to add significant amounts of water vapor and $CO_2$ to the ultra-pure gas stream during removal of the hydrocarbon impurities from the gas stream. Thus, reducing hydrocarbon impurities in a process gas to sub-ppb levels while maintaining very low levels of water vapor and $CO_2$ has proven extremely difficult. However, the inventors discovered that when conventional carbon material is heated in an ultra-dry, inert environment at a sufficient temperature and for a sufficient time according to the method of this invention as described below in detail, water and $CO_2$ molecules that normally occupy a significant number of sites on the conventional carbon material are driven out of the carbon material. As a result of the method of this invention, sites in the carbon material normally occupied by water and $CO_2$ in conventionally activated carbon are freed up, thereby producing an ultra-low emission (ULE) carbon material. These freed up sites are believed to have a high affinity for moisture and $CO_2$. Thus, unlike conventionally activated carbon, the ultra-low emission (ULE) carbon material of the present invention has freed up sites capable of efficiently trapping and retaining trace amounts of moisture along with other impurities from a gas stream, without concurrently emitting equal or greater amounts of moisture ($H_2O$) and carbon dioxide $CO_2$ back into the gas being purified. In other words, the method of the present invention changes the properties of conventionally activated carbon by transforming a conventional hydrophobic carbon material, which has most or all of its available hydrophilic sites occupied by water and other sites occupied by $CO_2$, to an ultra-low emission (ULE) carbon material, wherein a significant number of the strong hydrophilic sites capable of holding water molecules are unoccupied, and wherein a significant number of sites normally occupied by $CO_2$ are now unoccupied.

As stated above, since the ultra-low emission (ULE) carbon material of the present invention is strongly hydrophilic, it adsorbs small amounts of moisture very efficiently, even in relatively dry (sub-ppm levels of moisture) environments. However, since the moisture capacity of the ultra-low emission (ULE) carbon material of the present invention is small, the ultra-low emission (ULE) carbon material can quickly become saturated with moisture ($H_2O$) upon contact with very small amounts of moisture. For example, the relatively dry atmosphere of a conventional glove box can still contain enough water vapor to saturate the hydrophilic sites of the ultra-low emission (ULE) carbon material of the present invention in a matter of seconds. Typically, glove boxes have moisture levels of about 0.5–10 ppm, sometimes higher. Thus, if the ultra-low emission (ULE) carbon material becomes contaminated (i.e., saturated) with moisture, the carbon material is rendered useless as a gas purifier, since the moisture-saturated carbon would reemit moisture into the process gas stream that is being purified. Accordingly, the method of the present invention further includes an enclosed transport and filling mechanism (i.e., a "transfill system") for transferring the ultra-low emission (ULE) carbon material from a high-temperature activation reactor to a gas purifier container, wherein the transfill system is in an atmosphere having moisture levels much lower than those in a conventional glove box. Thus, the transfill system prevents recontamination of the ultra-low emission (ULE) carbon material after its production and the container maintains the ultra-low emission (ULE) carbon material in a substantially contaminant-free environment.

Briefly, to prepare an ultra-low emission (ULE) carbon material according to the present invention, a carbon material is placed in a reactor and is activated while in the reactor by subjecting the carbon material to a relatively high temperature for a given time period. In this superactivating process, as the reactor temperature is lowered, the activation period (i.e., the time required to produce an ultra-low emission (ULE) carbon material of this invention) must be increased accordingly. An ultra-dry inert gas flows through the carbon material contained in the reactor during the activation process, and the exhaust gas exiting the reactor may be directed to an instrument that measures the amount of water in the exhaust gas. According to the present invention, carbon materials are determined to be ultra-low emission (ULE) carbon materials when the concentration of water emitted by the carbon material (i.e., the water present in the exhaust gas) is about 1 part-per-billion (ppb) or less, more preferably 100 ppt or less, as measured for example with a hygrometer or Atmospheric Pressure Ion Mass Spectrometry (APIMS) after the ultra-low emission (ULE) carbon material has been cooled to room temperature. The ultra-low emission (ULE) carbon material of this invention is capable of removing impurities such as organic compounds, carbon dioxide, and carbon monoxide from process gases to produce ultra-pure gases, wherein the concentrations of all of the impurities in the ultra-pure gases are reduced to parts-per-billion (ppb) and sub-parts-per-billion (sub-ppb) levels.

The Carbon Material

The ultra-low emission (ULE) carbon materials of the present invention are preferably made from commercially available activated carbon materials in the form of beads, pellets or extrudates. Preferably ultra-low emission (ULE) carbon materials are prepared from a high-hardness carbon that produces only small amounts of carbon dust under typical working conditions for gas purification processes such as space velocities (volume of gas at standard temperature and pressure flowing per hour per unit volume of purifier) up to 10,000 $hr^{-1}$. Low dust emission avoids the blockage of particle filters that are typically installed downstream of purifier beds, and thus prevents the gas stream from being interrupted by a blocked particle filter. An ultra-low emission (ULE) carbon of the present invention can be derived from commercially available carbon materials, which may be activated or non-activated carbon. Suitable carbon materials for use in the present invention include carbon beads supplied by Advanced Technology Materials Incorporated ("ATMI" carbon), designed for safe delivery systems (SDS) for hazardous and reactive gas storage. ATMI carbon material is preactivated by Advanced Technology Materials Incorporated at 800° C. but is neither maintained in a suitable fashion after activation to meet the criterion for ultra-low emission (ULE) carbon nor analyzed for emissions. Another suitable carbon material for the production of ultra-low emission (ULE) carbon material is Norit® activated carbon supplied by the Aldrich Chemical Company.

Activated carbon is commercially available, and in fact such a commercial product is a preferred starting material for use in accordance with this invention to produce an ultra-low emission (ULE) carbon material of this invention. However, as stated above, such commercially available activated carbon is too contaminated with moisture, $CO_2$ and other impurities to be suitable for the gas purification requirements of the present invention. While commercially available carbon material is effective for removing hydrocarbon impurities from a process gas, it simultaneously emits water vapor and other oxygenated impurities into the process gas during a gas purification process at levels well above 1 ppb. The activation of conventional carbon material to produce ultra-low emission (ULE) carbon materials according to the method of the present invention overcomes the deficiencies of conventional carbon material, in that the ultra-low emission (ULE) carbon material is capable of producing purified process gases while concurrently keeping moisture levels in the purified gas well below one part-per-billion (ppb). That is, ultra-low emission (ULE) carbon materials of the present invention do not add water vapor to a gas stream that passes though the ultra-low emission (ULE) carbon material during a gas purification process.

In one preferred embodiment of this invention, an ultra-low emission (ULE) carbon material is prepared from ATMI carbon beads. ATMI carbon beads are spherical and have a diameter of about 0.7–1.0 millimeter. The spherical shape of the beads permits a high packing density in a canister of a gas purifier system without causing a significant pressure drop as gas flows through the densely packed beads during a gas purification process. Additionally, the ATMI carbon beads are very hard, and produce no visible amount of dust during gas purification.

Production of Ultra-low Emission (ULE) Carbon Materials

While the method of superactivating carbon materials to make the ultra-low emission (ULE) carbon materials as described below utilizes ATMI carbon beads, such a description is merely for ease of explanation. Thus, it will be understood by those of skill in the art that other carbon materials may be likewise suitable for use in the method of this invention.

In one embodiment of this invention, ATMI carbon beads are activated to remove moisture ($H_2O$) and $CO_2$ from the beads by heating the beads in a reactor at a sufficient temperature, preferably from 300° C. to 800° C, and more preferably from 500° C. to 700° C. During the heat activation, an ultra-dry inert gas such as nitrogen, helium or argon, or any combination thereof, is flowed through the reactor. As used herein, an ultra-dry inert gas refers to an inert gas that has been purified by flowing the gas through a suitable purifier such as the one disclosed in U.S. Pat. No. 4,603,148, to decrease the level of moisture impurity in the inert gas to below about 1 ppb. The carbon beads are heated under the inert gas flow for at least several hours, more preferably between about twenty four hours and five days, depending on the temperature.

During the activation process performed according to the method of this invention, the levels of impurities (e.g., moisture and $CO_2$) emitted from the carbon beads into the inert gas are preferably monitored using a hygrometer or Atmospheric Pressure Ion Mass Spectrometry (APIMS)

instrumentation. Activation of the carbon beads is determined to be complete when the moisture ($H_2O$) and $CO_2$ levels measured in the inert gas stream exiting the reactor at the activation temperature indicate that moisture and $CO_2$ concentrations are sufficiently low to be acceptable for ultra high purity applications, i.e., less than about 1 ppb at room temperature. Typically, emissions of about 10 ppm or less of moisture as measured at carbon bead temperatures above 500° C. are sufficient to guarantee that an ultra-low emission carbon material (ULE) has been produced and that the material will perform as an ultra-low emission carbon material when at ambient temperature.

FIG. 1 illustrates one embodiment of the present invention for producing an ultra-low emission (ULE) carbon material in accordance with this invention and for transporting the ultra-low emission (ULE) carbon material to a canister for use in a gas purifier system. In FIG. 1, heat reactor 12 contains a supply of carbon beads 14 that are to be superactivated in accordance with the invention. A dry, purified inert gas 18 such as helium, nitrogen, or argon, enters reactor 12 through inlet valve 22 and flows through carbon beads 14 during the activation process. Carbon beads 14 within heat reactor 12 are subjected to a high temperature, preferably from about 300° C. to 800° C., and more preferably from about 500° C. to 700° C., for at least several hours, more preferably between about twenty four hours and five days, depending on the temperature, as ultra-dry inert gas 18 flows continuously through carbon beads 14 in heat reactor 12. Inert gas 18 exits heat reactor 12 at outlet ball valve 26 and continues on through valve 30 to instrumentation 38. Instrumentation 38 monitors the chemical content of inert gas 18 exiting reactor 12 to determine when the activation of carbon beads 14 is complete. In one embodiment, instrumentation 38 is a hygrometer commercially available from Meeco, Ametek, or Panametrics, which monitors inert gas 18 exiting reactor 12 for moisture content. When the moisture ($H_2O$) content of inert gas 18 exiting reactor 12 at the activation temperature is reduced to the levels where sub-ppb emissions of moisture ($H_2O$) from the ultra-low emission (ULE) at room temperature are guaranteed, typically less than 10 ppm at 500° C., activation of carbon beads 14 is complete. The ultra-low emission (ULE) carbon beads 14 are then cooled, preferably to ambient temperature, while in reactor 12. Room temperature emissions of moisture and $CO_2$ can be verified at sub-ppb levels by replacing hygrometer instrumentation 38 with APIMS instrumentation.

Transfill of the Ultra-low Emission (ULE) Carbon

In order to minimize the contamination of the ultra-low emission (ULE) carbon by readsorption of moisture and other oxygenated materials such as $O_2$ and $CO_2$, the present invention provides a completely enclosed transfer and filling ("transfill") system. The transfill system, illustrated in FIG. 1, comprises an environmentally sealed, contamination-free transfer system that operates to physically transport a portion of the ultra-low emission (ULE) carbon beads 14 from the reactor to individual canisters while maintaining the ultra-low emission (ULE) carbon material in a substantially contaminant free environment. That is, the transfill system allows the ultra-low emission (ULE) carbon material to be transferred to individual containers without allowing moisture, carbon dioxide, or other contaminants to come into contact with the ultra-low emission (ULE) carbon material. The individual containers can then be incorporated into gas purifier systems.

Referring again to FIG. 1, the ultra-low emission (ULE) carbon beads 14 are first transferred from the reactor 12 through opened ball valve 26 to a calibrated glass cylinder 44 via gravity fill. Specialized ball valves such as ball valve 26 are desirable in order to minimize contamination of the ultra-low emission (ULE) carbon beads 14. A flexible line 40 allows the orientation of reactor 12 to be changed from the horizontal position used for activation of the carbon beads to a vertical position for the transfill process. The ultra-low emission (ULE) carbon beads 14 are transferred to calibrated cylinder 44 for volume determination under and ultra-dry inert gas flow 18 which flows through opened valves 22 and 26 and is vented through open valve 48, while all other valves in the system remain closed.

After the desired amount of ultra-low emission (ULE) carbon beads 14 is collected in the calibrated cylinder 44, ball valve 26 is closed and ball valve 52 is opened to allow the ultra-low emission (ULE) carbon beads 14 to flow through a flexible line 56 into a gas purifier canister 64. Canister 64 comprises a gas inlet valve 68, a gas outlet valve 76, and a receiving port 70 through which a portion of the ultra-low emission (ULE) carbon beads are transferred into canister 64. This transfer process from calibrated cylinder 44 to canister 64 is conducted under an ultra-dry inert gas flow 18 through opened valve 22, which is vented through opened diaphragm valve 76. A thorough cross purge with inert gas 72 through canister 64, calibrated cylinder 44, and vent lines to instrumentation 38 is necessary to remove moisture ($H_2O$), $CO_2$, and $0_2$ contamination from the canister and the transfill system prior to the filling procedure of the canister 64 in order to purge the transfill lines and the canister 64, thereby ensuring that the ultra-low emission (ULE) carbon material is not contaminated by residual impurities in the transfill system or the canister.

Once all of the ultra-low emission (ULE) carbon beads 14 are transferred from calibrated cylinder 44 to canister 64 having a gas inlet valve 68, a gas outlet valve 76, with outlet valve 76 closed, and a slow reverse ultra-dry inert gas stream 72 is initiated through valve 68 and vented though valve 48. The flow of inert gas 72 should remain small to prevent blowing the ultra-low emission (ULE) carbon beads out of canister 64 and back into the system. Flexible hose 56 is then disconnected from canister 64 at fitting 60 while inert gas 72 flows through valve 68 and vents through the disconnected fitting 60 to minimize contamination. The disconnection procedure is preferentially performed in a glove box or with a plastic purge bag that is inflated by an ultra pure inert gas and is attached above and below the fitting 60 to completely surround the fittings. The plastic bag provides a "micro environment" of a clean purge gas and further minimizes exposure to ambient contaminants. The open fitting 60 is then closed with a plug (not shown) while maintaining the inert gas purge 72. Canister 64, filled with ultra-low emission (ULE) carbon beads, is then ready for installation in a gas purifying system.

The exact details of construction of transfill system as illustrated in FIG. 1 are not critical to the invention, since a transfill system of this invention can take a number of physical forms. Thus it will be understood by those of skill in the art that a transfill system of this invention will be constructed and arranged so as to prevent contamination of carbon beads 14. That is, the transported ultra-low emission (ULE) carbon beads 14 residing in a canister 64 remain generally as highly activated as they were at the end of their activation within heat reactor 12.

Gas Purification Systems

One embodiment of a portion of a gas purification system of the present invention is illustrated in FIG. 2. This gas purification system comprises a one-component canister 64 containing ultra-low emission (ULE) carbon material 14. Canister 64 is prepared by the transfill process described above, and is then installed in a gas purification system for purification of gas 100.

An alternative embodiment of a portion of a gas purification system of the present invention is illustrated in FIG. 3. The system shown in FIG. 3 is a two-component gas purifier system for the purification of gas 100, wherein the two-component gas purifier comprises canister 64 containing ultra-low emission (ULE) carbon beads 14 connected in series with, and downstream of, a canister 164 containing secondary scavenger 82 for removing larger concentrations of moisture and oxygen that may be present in the impure process gas. The ultralow emission (ULE) carbon material does not remove oxygen and has only a small capacity for water vapor. The water capacity is only about 0.1% of that of typical chemical scavengers and thus, ultra-low emission (ULE) carbon will not address the requirements of typical high purity gas applications, where oxygen ($O_2$) and larger amounts of moisture are key impurities. A combined bed, however, has the benefit of large oxygen and/or moisture capacities as well as the capabilities to remove organic compounds and carbon monoxide (CO).

In one embodiment of the gas purification system illustrated in FIG. 3, the secondary scavenger material 24 comprises a metallated macroreticular polymer, wherein the polymer is metallated with a Group IA or Group IIB alkyl or aryl organometallic compound, as described in U.S. Pat. No. 4,603,148 to Tom, which is specifically incorporated herein by reference. In another embodiment, the secondary scavenger is a zeolite molecular sieve.

Alternatively, the secondary scavenger comprises, but is not limited to, inorganic high-surface-area solids such as oxides and mixed oxides, for example, alumina, silica, silica-alumina, aluminosilicate zeolites and other molecular sieves. These materials may be modified by salts, oxides or hydroxides of the Group IA or IIA metals, and preferably are thermally activated, as described in copending U.S. Provisional Patent Application No. 60/251,000, filed Dec. 4, 2000, which is specifically incorporated herein by reference. In one embodiment, the secondary scavenger comprises a Group IIA, IVA IIIB or IVB metal oxide such as an alumina oxide, alumina-based oxide, silica, or a silica-based oxide. Preferably, the metal oxide has a high surface area of at least about 30 $m^2/g$. In another embodiment, the secondary scavenger is an alumina oxide, alumina-based oxide, silica, or a silica-based oxide that has been modified by a salt, oxide, or hydroxide of a Group IA or Group IIA metal as described in copending U.S. Provisional Patent Application Serial No. 60/251,000, filed Dec. 4, 2000, supra. In this embodiment, the modifier comprises between about 1 to 20 percent weight of the modified material.

In the two-component gas purifier embodiment shown in FIG. 3, preparation of canister 164 containing secondary scavenger beads 82 involves the transfill process described above from container 80 containing secondary scavenger beads 82. Referring again to FIG. 1, reservoir 80 containing secondary scavenger beads 82 is incorporated into the transfill system. The secondary scavenger beads 82 are first transferred by gravity fill into calibrated cylinder 44 through flexible line 40, during which a stream of inert gas 84 flows through valve 88 and vents through valve 48. Once a measured amount of secondary scavenger beads 82 has been transferred to cylinder 44, valve 52 is opened to allow secondary scavenger beads 82 to be transferred through flexible line 56 into canister 164, while a flow of inert gas 84 through cylinder 44 and canister 164 is maintained. After secondary scavenger beads 82 have been completely transferred to canister 164, line 56 is disconnected from canister 164 at fitting 60 while a stream of inert gas 72 flows through canister 164. Fitting 60 is closed with a plug (not shown) while the inert gas purge 72 is maintained, after which canister 164 containing resin beads 120 is ready for use in the gas purifying system as illustrated in FIG. 3. Alternatively, canister 164 can be prepared according to standard filling procedures in a glove box. This is due to the fact that the large moisture and oxygen capacity of the secondary scavenger beads causes the beads to be less sensitive to exposure of small levels of contaminants during filling than the ultra-low emission (ULE) carbon material.

Canister 164 with the secondary scavenger beads 82 is then connected to canister 64 filled with the ultra-low emission (ULE) carbon material. The connection is preferentially performed while flowing an ultra-dry inert gas through canister 64 while keeping the inlet and outlet of canister 164 closed, to purge contaminants from the connection with an ultra-dry inert gas prior to closing the connection.

FIG. 4 shows a portion of another embodiment of a two-component gas purifier system of the invention. The gas purifier system illustrated in FIG. 4 includes a canister 264 having an upstream portion of secondary scavenger beads 82 selected from the materials described above and a downstream portion of ultra-low emission (ULE) carbon beads 14.

Canister 264 is prepared using the transfill system illustrated in FIG. 1. One embodiment of preparing canister 264 comprises first partially filling canister 264 with a measured amount of ultra-low emission (ULE) carbon beads 14 using the transfill system as described above, followed by filling the remaining volume of canister 264 with the secondary scavenger beads 82 using the transfill as described above. The transfill system for preparing canister 264 includes the appropriate inert gas purges as described above to prevent contamination of canister 264 by moisture ($H_2O$), $O_2$ and $CO_2$.

FIG. 5 illustrates an alternative embodiment of a two-component gas purifier system of this invention. The two-component gas purifier shown in FIG. 5 comprises canister 364 containing a mixture of ultra-low emission (ULE) carbon beads 14 and secondary scavenger beads 82 selected from the materials described above. Canister 364 is prepared using the above-described transfill system for preparing canister 264. The mixing of ULE carbon beads 14 and secondary scavenger beads 82 can be performed by mechanical agitation while beads 14 and 82 are contained within calibrated cylinder 44 (FIG. 1), or after beads 14 and 82 have been transferred to canister 364.

The foregoing description is considered as illustrative only of the principles of the invention. Further, since numerous modifications and changes will be readily apparent to those skilled in the art, it is not desired to limit the invention to the exact construction and process shown as described above. Accordingly, all suitable modifications and equivalents may be resorted to falling within the scope of the invention as defined by the claims that follow.

The words "comprise," "comprising", "include," "including," and "includes" when used in this specification and in the following claims are intended to specify the presence of stated features, integers, components, or steps, but they do not preclude the presence or addition of one or more other features, integers, components, steps, or groups thereof.

EXAMPLES

Example 1

Production of an Ultra-low Emission (ULE) Carbon

Figure 6:
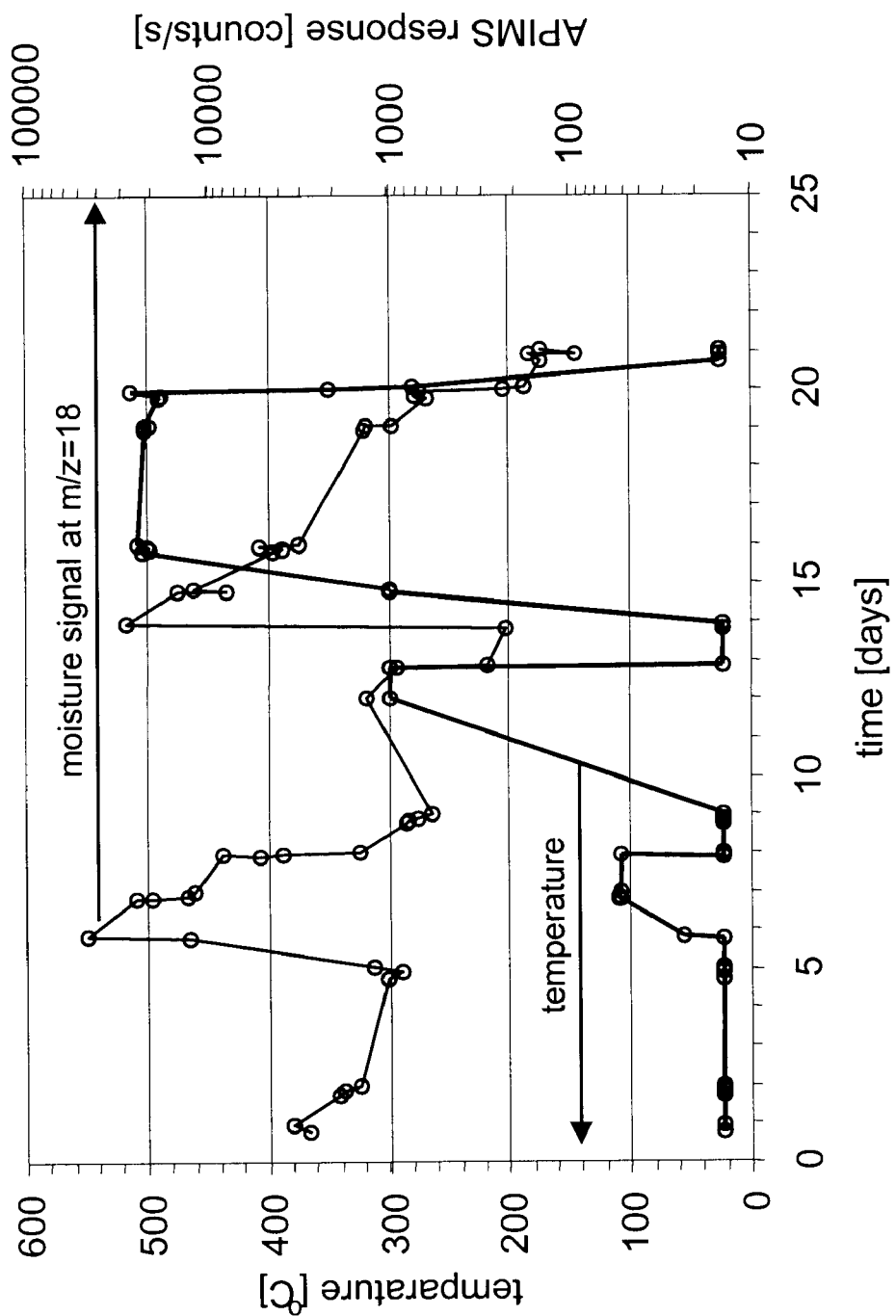
FIG. 6 is a graph plotting moisture ($H_2O$) emission (thin line) and temperature (thick line) in an exhaust gas in counts per second versus time (days) during the production of the ultra-low emission (ULE) carbon beads, as measured by APIMS.

ATMI carbon beads (10 mL) were heated stepwise in a reactor over several days in an ultra-dry nitrogen atmosphere at a 2 slpm (standard liters per minute) flow rate, and the concentrations of moisture and carbon dioxide ($CO_2$) in the exhaust stream were monitored by APIMS. FIG. 6 shows the results obtained during monitoring of moisture emission, where the thin line represents the moisture emission levels, and the thick line represents temperature of the reactor.

The initial levels of moisture in the exhaust gas at ambient temperature decreased slowly over several days. An increase of the activation temperature from room temperature to 110° C. increased the amount of moisture in the exhaust gas stream by a factor of about 500. After cooling back to room temperature, the moisture level in the exhaust gas stream rapidly dropped to concentrations below that observed prior to heating. Further heating to 300° C. and to 500° C. resulted in an additional release of significant amounts of moisture ($H_2O$) from the carbon material. After activation of the carbon at 500° C. for five days, the moisture levels emitted into the exhaust gas stream at 500° C. approached concentrations observed in the exhaust stream at ambient temperature prior to the activation procedure, that is, about 500–1000 counts/s. After cooling to room temperature, the moisture response dropped to about 100 counts/s, indicating sub-ppb moisture concentrations. The carbon dioxide emission followed similar trends to the moisture emission (data not shown).

Example 2

Removal of Straight-chain Hydrocarbons from a Gas Stream Using an Ultra-low Emission (ULE) Carbon Material A gas purifier comprising a densely packed bed of ultra-low emission (ULE) carbon beads (60 cc) prepared according to the method of this invention was installed downstream of a calibration system capable of adding trace amounts of hydrocarbons vapors into a gas stream.

Figure 7:
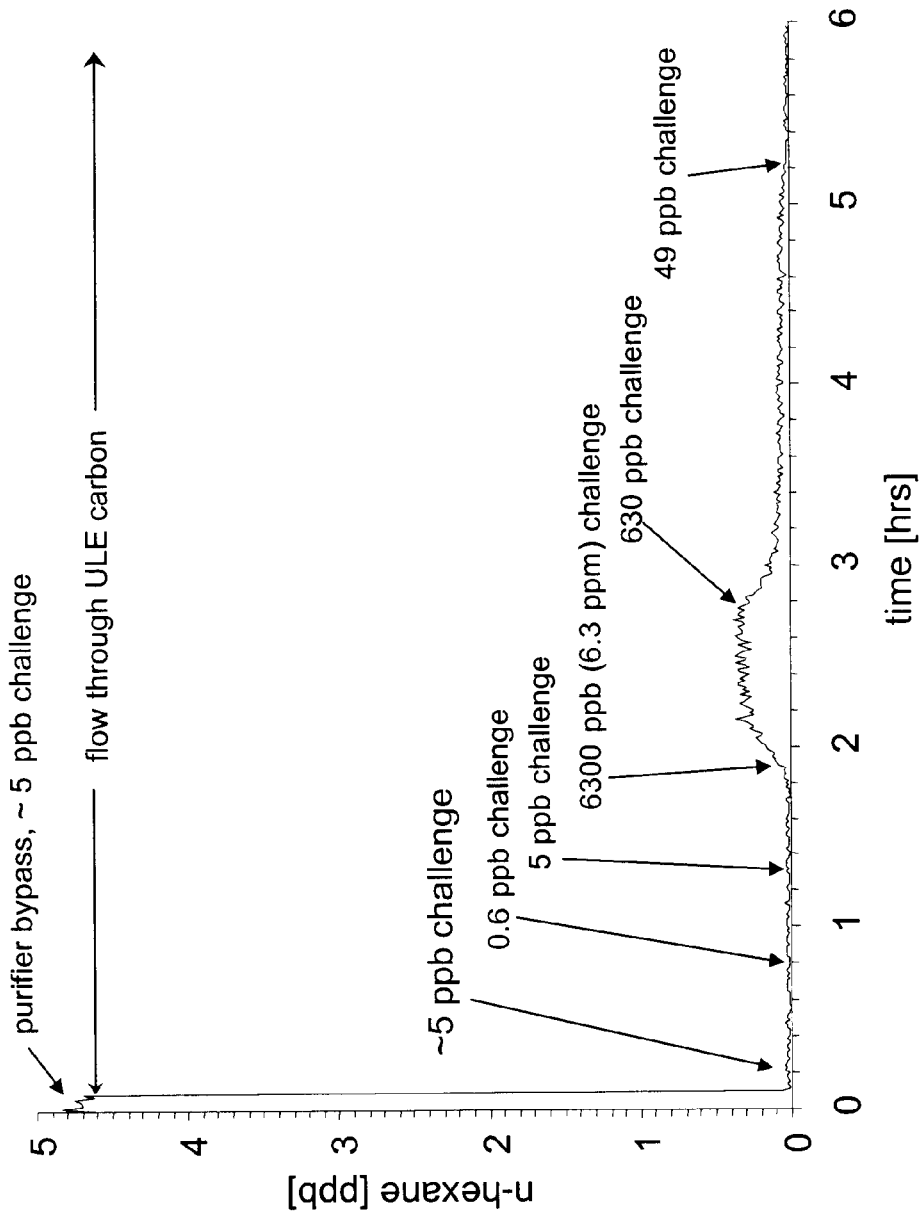
FIG. 7 is a graph plotting hexane concentration in parts-per-billion versus time in hours for various hexane challenges in a stream of argon flowing through a ultra-low emission (ULE) carbon material of this invention, as measured by APIMS.

The efficiency of the ultra-low emission (ULE) carbon beads in removing the trace hydrocarbons from an ultra-dry argon stream was studied using APIMS instrumentation that was installed downstream of the bed of ultra-low emission (ULE) carbon beads. FIG. 7 shows the results after flowing argon containing trace amounts of hexane (i.e., between about 0.6 ppb and 6.3 ppm) through a bed of ultra-low emission (ULE) carbon beads at a flow rate of 2 slpm. Initially, the gas purifier containing the ultra-low emission (ULE) carbon beads was bypassed to establish a 5 ppb hexane concentration in the argon gas stream. When the argon gas stream containing the hexane impurity was directed through the gas purifier, the hexane concentration in the exhaust argon gas stream exiting the purifier dropped to below the detection limit of the APIMS instrumentation. That is, the concentration of hexane in the exhaust stream was less than 100 ppt.

While flowing through the purifier, the hexane challenge was varied between 0.6 ppb and 6.3 ppm. A slight breakthrough of about 0.5 ppb hexane was observed at the high challenge of 6.3 ppm, corresponding to a removal of hexane vapor by a factor of more than 10,000. Below a challenge of about 50 ppb the hexane concentration in the exhaust gas stream was not distinguishable from the baseline.

Example 3

Figure 8:
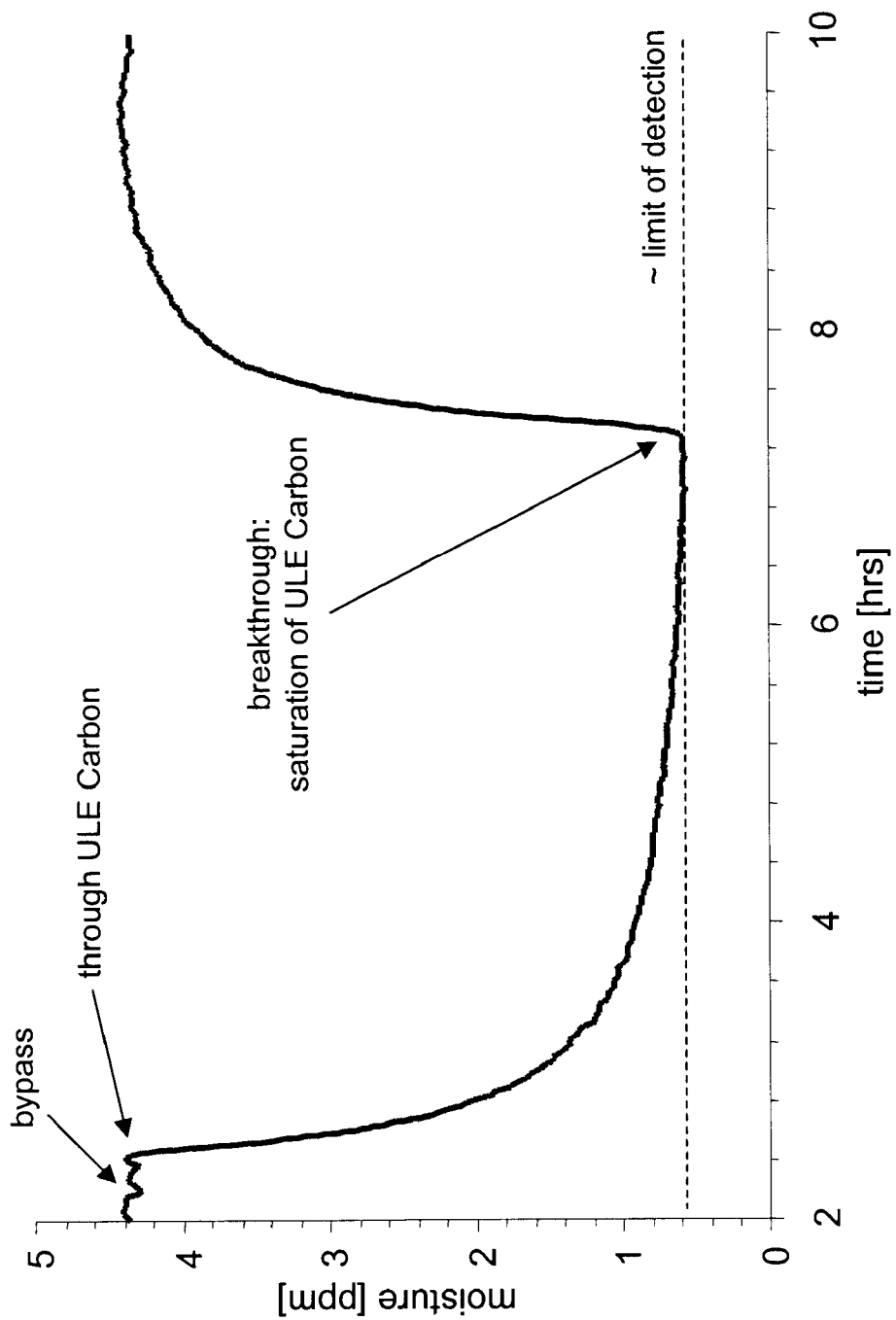
FIG. 8 is a graph plotting moisture ($H_2O$) concentration measured by an AMETEK 5850 hygrometer versus time for a gas stream that initially bypasses an ultra-low emission (ULE) carbon bed and then is directed through the ultra-low emission (ULE) carbon bed until moisture breakthrough occurs.

Removal of Moisture ($H_2O$ from a Gas Stream Using an Ultra-low Emission (ULE) Carbon Beads FIG. 8 shows the removal of a about 5 ppm moisture challenge in nitrogen at 500 cc/min flow by a purifier containing 60 cc of ultra-low emission (ULE) carbon beads. The measurements were performed with an AMETEK 5850 moisture analyzer (Ametek, Paoli, Pa.). The detection limit of the setup was about 0.5 ppm. The elimination of the water challenge confirmed that the ultra-low emission (ULE) carbon beads were strongly hydrophilic. The amount of water vapor removed until breakthrough occurred was about 0.01 liter water vapor at standard conditions per liter ultra-low emission (ULE) carbon beads.

Example 4

Figure 9:
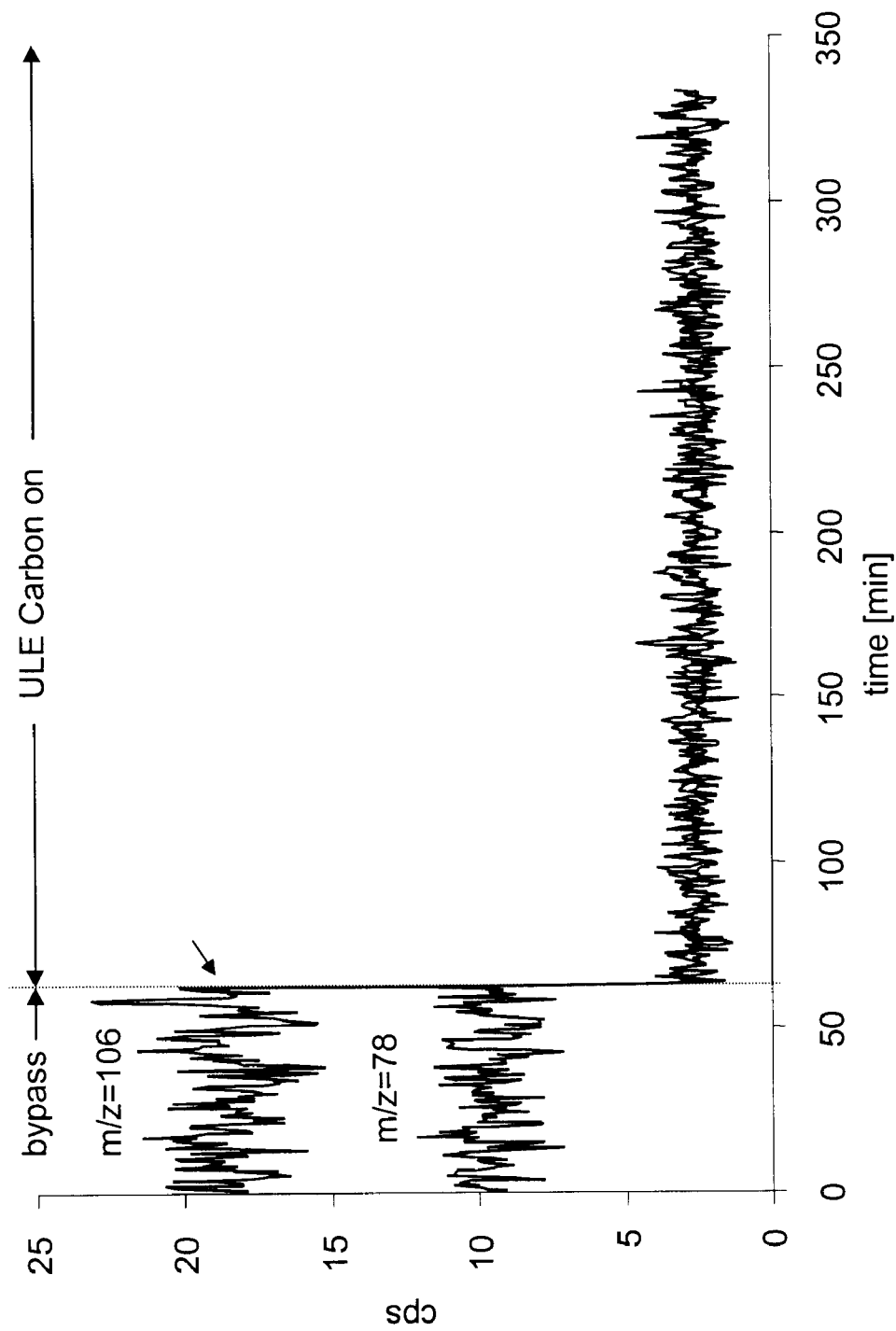
FIG. 9 is a graph plotting the response of APIMS in counts-per-second (cps) versus time in minutes of a nitrogen stream challenged with a mixture of benzene (m/z=78) and ethylbenzene (m/z=106) that initially bypasses an ultra-low emission (ULE) bed and then is directed through a bed of ultra-low emission (ULE) carbon material of this invention.

Removal of Aromatic Species from a Gas Stream Using an Ultra-low Emission (ULE) Carbon Beads FIG. 9 shows the removal of trace amounts of the aromatic species benzene (m/z=78) and ethylbenzene (m/z=106) from a nitrogen stream at 2000 cc/min by a purifier filled with 10 cc of ultra-low emission (ULE) carbon beads. The measurements were performed by APIMS. The instrument response at m/z=78 and m/z=106 while flowing the contaminated nitrogen through the purifier was identical to the background response obtained with a nitrogen gas stream free of benzene and ethylbenzene.

Example 5

Figure 10:
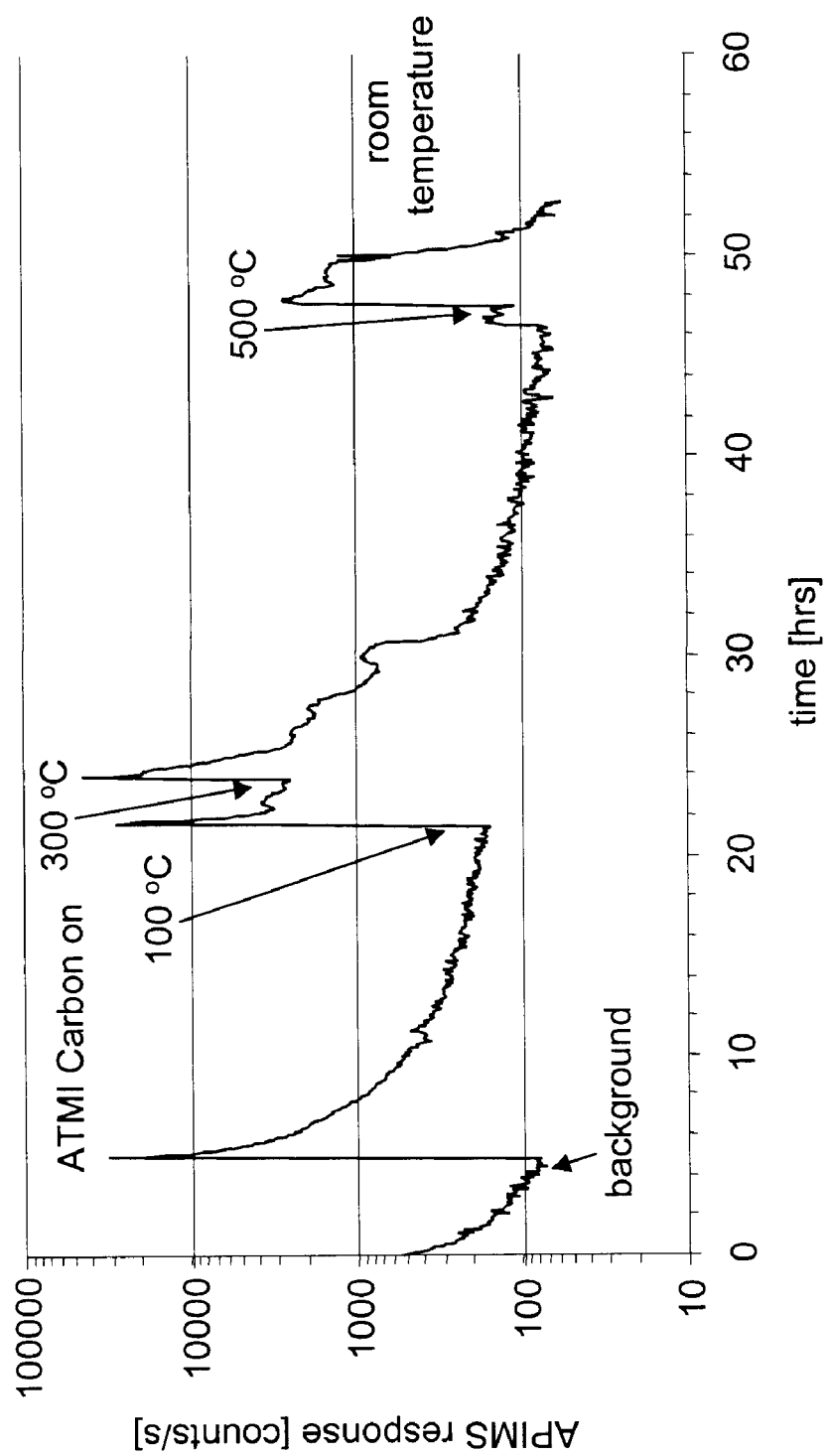
FIG. 10 is a graph plotting the moisture response of APIMS in counts per second (cps) versus time in minutes of a nitrogen stream initially bypassing and then passing through a carbon bed activated in situ by Advanced Technology Materials Incorporated in an air tight canister.

Moisture Level Measurements of an ATMI Carbon Sample Activated and Shipped in Air-tight Vessel A sample of ATMI carbon that had been activated and packaged by Advanced Technology Materials Incorporated was tested for moisture content. FIG. 10 shows moisture outgassing of a 50 cc carbon sample contained in an air-tight stainless steel reactor and which had been activated by Advanced Technology Materials Incorporated in-situ using cylinder quality helium (99.999% purity) as purge gas. Activation conditions used by Advanced Technology Materials Incorporated comprised heating the ATMI carbon at 800° C. for 8 hrs under 200 sccm helium flow.

Outgassing of moisture from the ATMI carbon was investigated using APIMS instrumentation and a nitrogen matrix at 2 slpm. After the system was dried in an ultra-dry inert gas stream to obtain a moisture response of less than about 100 counts/s (400–500 counts/s, which corresponds to about 1 ppb), the vessel containing the ATMI carbon was switched in line and a moisture spike of about 30,000 counts/s was observed. After 14 hours of dry down, the response decreased to about 200 counts/s. The temperature was then increased to 100°, 300° and 500° C., causing further emission of significant quantities of water. The results indicated that ATMI carbon as activated and stored by Advanced Technology Materials Incorporated is not sufficient to meet the requirements for ultra-low emission (ULE) carbon material. Impurities in the 5.5 grade helium purge gas, such as low ppm moisture levels, as well as insufficient conditioning times were suspected as main contributors to the observed outgassing of moisture.

We claim:

1. An ultra-low emission carbon material capable of removing impurities from a gas containing said impurities to produce an ultra-pure gas without concurrently emitting moisture into said gas being purified such that the concentrations of said impurities in said ultra-pure gas product are less than 1 part-per-billion, and wherein said ultra-low emission carbon material is stored in a substantially non-contaminating environment until contacted with said gas containing said impurities.

2. The ultra-low emission carbon material of claim 1, wherein said impurities comprise water.

3. The ultra-low emission carbon material of claim 1, wherein said impurities comprise carbon dioxide.

4. The ultra-low emission carbon material of claim 1, wherein said impurities comprise carbon monoxide.

5. The ultra-low emission carbon material of claim 1, wherein said impurities comprise organic compounds.

6. The ultra-low emission carbon material of claim 5, wherein said organic compounds comprise straight chain or branched chain hydrocarbons.

7. The ultra-low emission carbon material of claim 5, wherein said organic compounds comprise straight chain or branched chain hydrocarbons.

8. The ultra-low emission carbon material of claim 6, wherein said hydrocarbon is hexane.

9. The ultra-low emission carbon material of claim 7, wherein said aromatic hydrocarbon is benzene, or ethylbenzene.

10. The ultra-low emission carbon material of claim 1, wherein the concentration of said impurities in said ultra-pure gas is measured by Atmospheric Pressure Ion Mass Spectrometry.

11. An ultra-low emission carbon material produced according to the method comprising:
   a) placing a carbon material containing trace amounts of water in a reactor having a gas inlet and a gas outlet;
   b) heating a carbon material in said reactor for at least twenty four hours at a temperature between about 300° C. and 800° C. under a flow of ultra-dry inert gas;
   c) measuring the amount of water in said inert gas exiting said reactor;
   d) terminating said heating when the concentration of water in said inert gas exiting said reactor is below about one part-per-million, whereby said ultra-low emission carbon material is produced; and
   e) maintaining said ultra-low emission carbon material in a substantially non-contaminating environment.

12. The ultra-low emission carbon material of claim 11, wherein said method further comprises:
   f) providing a container having a gas inlet port, a gas outlet port, and a receiving port:
   g) purging said container with an ultra-dry inert gas;
   h) transferring a portion of said ultra-low emission carbon material from said reactor to said container while flowing an ultra-dry inert gas through said container, and
   i) closing said receiving port while maintaining the flow of inert gas through said container; and
   j) closing said inlet and outlet ports, whereby said ultra-low emission carbon material is maintained in said container in an ultra-dry inert atmosphere.

13. The process of claim 12, wherein said container is adapted for use in a gas purifying system.

14. The process of claim 11, wherein said carbon material is heated for between about two days and five days.

15. The process of claim 11, wherein said carbon material is heated at a temperature between about 500° and 700° C.

16. The process of claim 11, wherein the amount of water in said inert gas exiting said reactor is measured with a hygrometer or Atmospheric Pressure Ion Mass Spectrometry instrumentation.

17. The process of claim 11, wherein said ultra-low emission carbon material is capable of reducing trace amounts of impurities in a process gas to less than about one part-per-billion.

18. The process of claim 17, wherein said impurities are selected from organic compounds, carbon dioxide, carbon monoxide and water.

19. The ultra-low emission carbon material of claim 18, wherein said organic compounds comprise straight chain or branched chain hydrocarbons.

20. The ultra-low emission carbon material of claim 18, wherein said organic compounds comprise aromatic hydrocarbons.

21. The ultra-low emission carbon material of claim 19, wherein said hydrocarbon is hexane.

22. The ultra-low emission carbon material of claim 20, wherein said aromatic hydrocarbon is benzene, or ethylbenzene.

* * * * *